United States Patent [19]

Yamamoto

[11] Patent Number: 4,686,659
[45] Date of Patent: Aug. 11, 1987

[54] COLOR SONAR SYSTEM FOR DISPLAYING ECHO SIGNALS FROM FISH

[75] Inventor: Shigeo Yamamoto, Aichi, Japan

[73] Assignee: Keisuke Honda, Aichi, Japan

[21] Appl. No.: 745,264

[22] Filed: Jun. 14, 1985

[51] Int. Cl.⁴ .......................... G01S 15/96; G01S 7/62
[52] U.S. Cl. ...................................... 367/87; 367/101; 367/110
[58] Field of Search .................. 367/87, 101, 110, 113

[56] References Cited

U.S. PATENT DOCUMENTS 4,290,125  9/1981  Honda ................................... 367/87

Primary Examiner—Richard A. Farley
Attorney, Agent, or Firm—Burgess, Ryan & Wayne

[57] ABSTRACT

In a color sonar system especially suitable for displaying fish echo signals, high and low frequency echo image signals are displayed utilizing colors corresponding to the echo signal strength, when the signal strength differences between the simultaneously received high and low frequency echo image signals are within a preset level range, when the differences between the high and low frequency echo image signals are outside the preset level range, the selected high frequency or low frequency echo image signals are displayed utilizing colors indicative of the differences in signal strength between the corresponding high frequency and low frequency echo signals.

5 Claims, 2 Drawing Figures

FIG. 2

TABLE 1

| | | |
|---|---|---|
| ↑ LEVEL STRENGTH | 7 | RED |
| | 6 | YELLOW |
| | 5 | GREEN |
| | 4 | WHITE |
| | 3 | MAGENTA |
| | 2 | CYANOGEN |
| | 1 | BLUE |
| | 0 (NO SIGNAL) | BLACK OR BLUE |

TABLE 2

| HIGH FREQUENCY | LOW FREQUENCY | DIFFERENCE | IMAGE |
|---|---|---|---|
| (6) YELLOW | (6) YELLOW | (0) | BLUE |
| (6) YELLOW | (5) GREEN | (1) | BLUE |
| (6) YELLOW | (4) WHITE | (−2) | YELLOW |
| (4) WHITE | (5) GREEN | (+1) | BLUE |
| (4) WHITE | (2) CYANOGEN | (−2) | WHITE |

4,686,659

COLOR SONAR SYSTEM FOR DISPLAYING ECHO SIGNALS FROM FISH

BACKGROUND OF THE INVENTION

The present invention relates to a color sonar system for displaying a high echo signal and a low echo signal with a predetermined color for each level thereof.

Generally, an ultrasonic wave of a high frequency is reflected by small fish in the surface of the sea and an ultrasonic wave of a low frequency is reflected by large fish in the deep portion of the sea. Therefore, when the low frequency ultrasonic echo signals which are reflected from reflecting surfaces in the sea are subtracted from the high frequency ultrasonic echo signals which are reflected from reflecting surfaces in the sea at the same time, signals of the same level as each other are eliminated. Therefore, because the high and low frequency echo signals which are reflected by the surface and the bottom of the sea are of the same level as each other, these signals are eliminated.

However, the level of the echo signals reflected by a school of small fish are different from the other signals; thus these signals are not eliminated. When the signals which are reflected by the school of small fish are applied to a cathode ray tube, a picture of the school of small fish is displayed on its screen.

On the basis of this principle, a color fish sonar can be provided in which high and low frequency ultrasonic waves are respectively transmitted from high and low frequency transducers to the sea, and the high and low frequency echoes reflected by the bottom of the sea and a school of fish are respectively received by high and low frequency transducers and are converted high and low frequency echo signals respectively. These high and low frequency echo signals are amplified by high and low frequency amplifiers, and the differences between the high and low frequency echo signals at various levels are displayed by a color cathode ray tube.

In this color fish sonar, only the differences between the high and low frequency echo signals are displayed with predetermined colors at each level. Therefore, because the differences between the levels of the high and low frequency echo signals are not displayed, the kind and distribution of fish cannot be correctly discriminated by such a display.

SUMMARY OF THE INVENTION

It is, therefore, the primary object of the present invention to provide a color sonar system capable of discriminating the kind and distribution of fish.

Another object of this invention is to provide a color sonar system for displaying the colors corresponding to the differences between the levels of the high and low frequency echo signals.

In order to accomplish the above and other objects, the present invention provides a color selector comprising: high and low frequency transmitters for transmitting high and low frequency output pulse signals by trigger signals produced from a central processor unit (CPU), high and low frequency transmitting-receiving vibrators for transmitting high and low frequency ultrasonic waves according to the high and low frequency output pulse signals from the high and low frequency transmitters and for receiving high and low frequency echoes, amplifiers for amplifying high and low frequency echo signals received by the high and low frequency transmitting - receiving vibrators, analog-to-digital (A/D), A/D converters for converting the high and low frequency echo signals amplified by the amplifiers to high and low frequency digital echo signals, a buffer memory for memorizing the high and low frequency digital echo signals from the A/D converters, a digital random-acess-memory (D-RAM) for memorizing the high and low frequency digital echo signals from the buffer memory in synchronism with every one or plural trigger signals from the CPU, an echo writing raw address circuit for designating a raw address to the high and low frequency digital echo signals memorized in the D - RAM, an echo writing column address circuit for designating a column address to the high and low frequency digital echo signals, high and low frequency image memories for respectively memorizing the high and low frequency digital echo signals by the address signals from the echo writing raw address circuit and the echo writing column address circuit, a select processing circuit for producing specific color signals when the differences between the levels of the digital echo image signals to display and the other digital echo image signals in the high and low frequency digital echo image signals (which are respectively read from the high and low frequency image memories) are within the predetermined range and for producing color signals corresponding to the levels of the echo digital image signals to be displayed when the differences between the levels of the one digital echo image signals to be displayed and the other digital echo image signals are outside the predetermined range, and a cathode ray tube for displaying the specific color signals or the color signals corresponding to the levels of the one echo digital image signals to be displayed.

These and other objects, features and advantages of the invention will become more apparent from the following description taken in connection with the accompanying drawings.

BRIEF DESCRIPTION OF THE DRAWINGS

FIG. 2 illustrates a Table 1 showing image colors corresponding to the relative strength of digital echo image signals and a Table 2 showing the image colors corresponding to the differences between high frequency digital echo signals and low frequency digital echo signals.

DESCRIPTION OF THE PREFERRED EMBODIMENT

Figure 1:
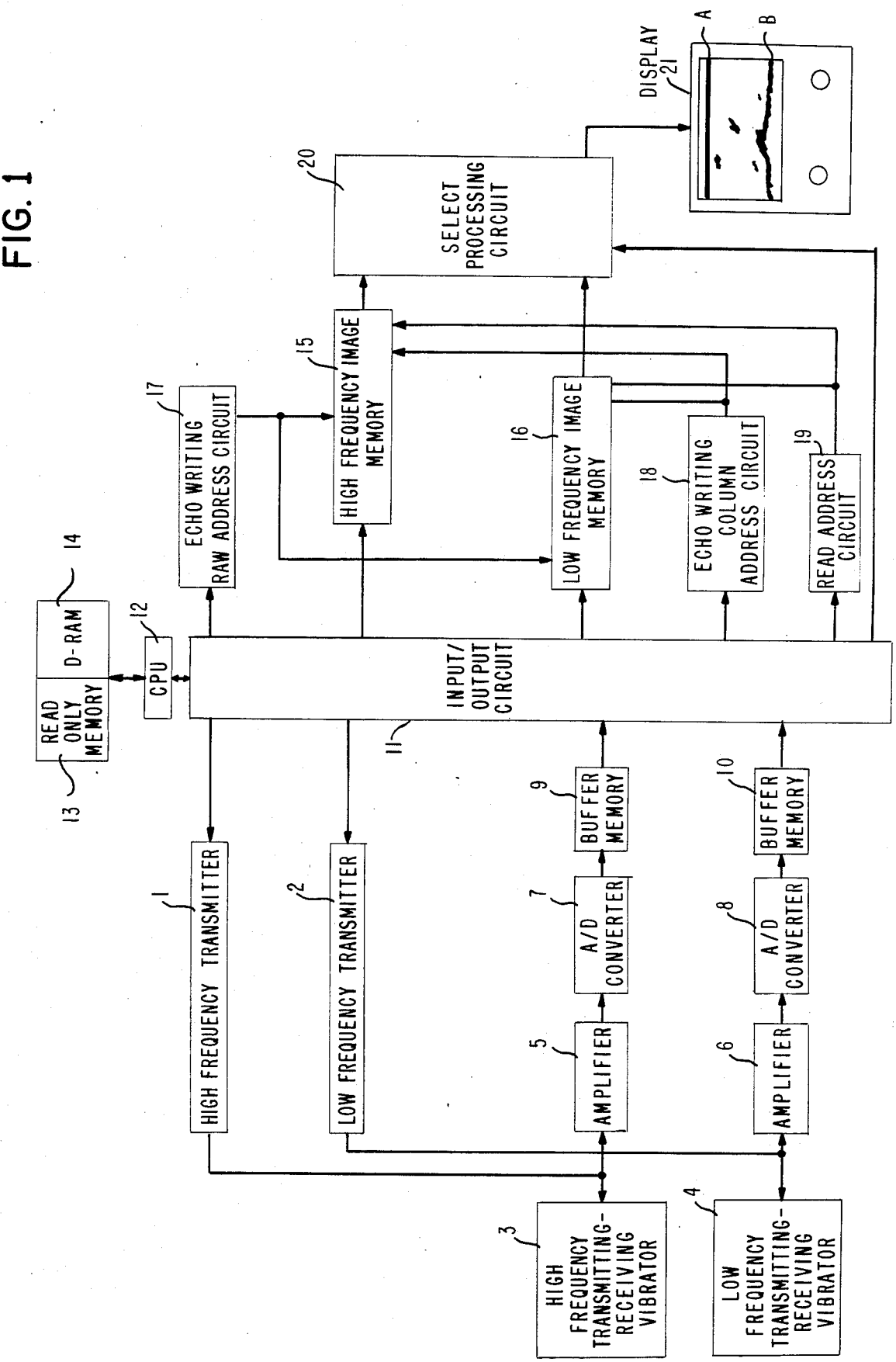
FIG. 1 illustrates a schematic block diagram of a color sonar system according to an embodiment of the present invention.

Referring to FIG. 1 of the drawings, the output terminals of high and low frequency ultrasonic transmitters 1 and 2 are connected to high and low frequency ultrasonic transmitting-receiving vibrators or transducers 3 and 4 and amplifiers 5 and 6 respectively.

The output terminals of the amplifiers 5 and 6 are connected to analog-to-digital (A/D) converters 7 and 8 respectively. The output terminals of the A/D converters 7 and 8 are connected to buffer memories 9 and 10 respectively and the output terminals of the buffer memories 9 and 10 are connected to an input/output circuit 11.

The input/output circuit 11 connects to a central processing unit (CPU) 12, a read only memory 13, and a digital random-access-memory (D-RAM) 14. Also, the input/output circuit 11 connects to high and low frequency image memories 15 and 16, an echo writing raw address circuit 17, an echo writing column address circuit 18, read address circuit 19 and the input terminals of the high and low frequency transmitters 1 and 2 respectively.

The output terminals of the high and low frequency image memories 15 and 16 are connected to input terminals of a select processing circuit 20, the output of which is connected to a color display 21 such as a color cathode ray tube.

The mode of operation of this embodiment will be described with reference to Table 1 showing the relative strength of high and low frequency digital echo image signals, and Table 2 showing image colors corresponding to the differences between the high and low frequency digital echo image signals.

When high and low frequency output pulses are produced by the trigger signals from CPU 12 respectively, the high and low frequency output pulses from transmitters 1, 2 are converted to high and low frequency ultrasonic waves by the transmitting - receiving vibrators 3 and 4, which ultrasonic waves are respectively emitted in the sea or in another body of water.

The high and low frequency echoes of the ultrasonic waves are respectively reflected by a school of fish and by the bottom of the sea or the water. The echo waves are received by the transmitting - receiving vibrators 3 and 4 and are respectively converted to high and low echo signals to be amplified by the amplifiers 5 and 6.

The amplified high and low frequency echo signals are converted to high and low frequency digital echo signals by A/D converters 7 and 8 respectively. After these high and low frequency digital echo signals are stored in the buffer memories 9 and 10, these signals are transmitted to D - RAM 14.

The high and low frequency echo signals which are memorized in the D - RAM 14 are divided into colors with a different color for each range of relative signal strength as shown in Table 1 of FIG. 2; and are stored in the high and low frequency image memories 15 and 16 as corresponding high and low frequency echo image signals in response to every one or more trigger signals from the CPU 12, or in response to signals corresponding to each vertical line between the base line A and the bottom line B as shown in the screen of the cathode ray tube 21.

The high and low echo image signals which are stored in the high and low frequency memories 15 and 16 are applied to the select processing circuit 20; and are compared with each other in response to every one or more trigger signals from the CPU 12. When the difference signals between the simultaneously received high and low frequency echo image signals are within the predetermined value ranges shown in Table 2 of FIG. 2, the corresponding echo image signals are shown in the display 21 by a specific color. When the difference signals between the simultaneously received high and low frequency echo image signals are outside the predetermined value ranges, the corresponding echo image signals are shown in the display 21 by the colors as shown in Table 1 of the FIG. 2.

Generally speaking, the operator of the display would select a high frequency echo signal display to observe small fish and a low frequency echo signal display to observe large fish. The high and low frequency echo image signals are selectively, i.e. alternately displayed by the colors corresponding to respective levels as shown in Table 1 of FIG. 2. When the signal strength differences between the high and low frequency echo image signals are within a predetermined value range ($\pm 1$), the corresponding echo image signals are displayed by the specific color "blue". When the signal strength differences between the high and low frequency echo signals are outside this predetermined value range, the echo image signals are displayed by another color as shown in Table 1.

That is, when the high frequency echo image signals are selected as the signals to be displayed, the low frequency echo image signals are the signals to be compared thereto. If the level of the high frequency echo image signal is "6", the display color of which is "yellow", and the level of the corresponding low frequency echo image signal is "6", the display color of which is yellow, the difference between these levels is "0" and is within the preset difference value range ($\pm 1$). Therefore, the high frequency echo image signal is displayed by the specific color "blue".

When the level of the high frequency echo image signal is "6", the display color of which is yellow, and the level of the corresponding low frequency echo image signal is "4", the display color of which is white, the difference between these levels is "$-2$" which is outside the preset value range ($\pm 1$). Therefore, the high frequency echo image signal is displayed by the display color "white" as shown in Table 1.

When the level of the high frequency echo image signal is "4" the display color of which is white, and the level of the corresponding low frequency echo image signal is "5", the display color of which is green, the difference between these levels is within the preset value range ($\pm 1$). Therefore, the high frequency echo image signal is displayed with the specific color "blue".

When the level of the high frequency echo image signal is "4", the display color of which is white, and the level of the corresponding low frequency echo image signal is "6", the display color of which is yellow, the difference between these levels is ($-2$) which is outside the preset value range. Therefore, the high frequency echo image signal is displayed by the display color "white" of the high frequency echo image signal as shown in Table 1.

According to the present invention, when small fish are displayed by the high frequency echo image signal and the difference between the levels of the corresponding high and low frequency echo image signals are outside the preset value range, the high frequency echo image signals are displayed with the colors corresponding to the signal strength of these levels. Therefore, the kind and distribution of small fish are clearly observed.

In the display of large fish, the low frequency echo image signals are used. Also, when each of the high and low frequency echo image signals is applied to the select processing circuit 20, the high and low frequency echo image signals are selectively displayed in the display 21 by the colors corresponding to the levels as shown in Table 1 of the FIG. 2.

What is claimed is:

1. A color selector comprising:
   CPU means for producing trigger signals;
   high and low frequency transmitters for transmitting high and low frequency output pulse signals in response to said trigger signals;
   high and low frequency transmitting - receiving vibrators for transmitting high and low frequency ultrasonic waves in response to the high and low frequency output pulse signals from the high and low frequency transmitters and for receiving high and low frequency echoes; amplifiers for amplifying the high and low frequency echo signals received by the high and low frequency transmitting - receiving vibrators;

A/D converters for converting the high and low frequency echo signals amplified by the amplifiers to high and low frequency digital echo signals;

a buffer memory for storing the high and low frequency digital echo signals from the A/D converters;

A D - RAM for storing the high and low frequency digital echo signals from the buffer memory in response to a group of at least one trigger signal from the CPU means;

an echo writing raw address circuit for designating a raw address to the high and low frequency digital echo signals stored in the D - RAM;

an echo writing column address circuit for designating a column address to the high and low frequency digital echo signal;

high and low frequency image memories respectively storing the high and low frequency digital echo signals by the address signals from the echo writing raw address circuit and the echo writing column address circuit;

a select processing circuit for producing predetermined color signals when differences between the levels of the high and low frequency digital echo image signals, which are respectively read from the high and low frequency image memories, are within a predetermined value range, and for producing color signals corresponding to the levels of the one of the high and low frequency digital echo image signals when the differences between the levels of the high and low frequency digital echo image signals are outside the predetermined value range; and a cathode ray tube for displaying the predetermined color signals or the color signals corresponding to the levels of the digital echo image signals.

2. A color selector as defined in claim 1 wherein the echo digital image signals to be displayed are high frequency signals.

3. A color selector as defined in claim 1 wherein the echo digital image signals to be displayed are low frequency signals.

4. A color selector as defined in claim 1 wherein the display is a color cathode ray tube.

5. A color selector comprising:

central processing means for producing trigger signals;

high and low frequency transmitter means for transmitting high and low frequency output pulse signals in response to said trigger signals;

high and low frequency transmitting-receiving vibrator means for transmitting high and low frequency ultrasonic waves in response to the high and low frequency output pulse signals and for receiving high and low frequency echos, respectively;

analogue to digital converter means for converting the high and low frequency echo signals to digital form;

memory means for storing the high and low frequency digital echo signals;

select processing means for producing predetermined color signals when differences between the levels of the high and low frequency digital echo image signals from said memory means are within a predetermined value range, and for producing color signals corresponding to the levels of one of the high and low frequency digital echo image signals when the differences between the levels of the high and low frequency digital echo image signals are outside the predetermined value range; and monitor means for displaying the predetermined color signals or the color signals corresponding to the levels of the digital echo image signals.

* * * * *